United States Patent
Apte et al.

(10) Patent No.: US 7,279,025 B2
(45) Date of Patent: Oct. 9, 2007

(54) SEPARATION AND REACTION METHOD UTILIZING AN OXYGEN ION TRANSPORT ELEMENT

(75) Inventors: Prasad S. Apte, East Amherst, NY (US); Joseph M. Schwartz, Williamsville, NY (US); James E. White, Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 398 days.

(21) Appl. No.: 11/017,041

(22) Filed: Dec. 21, 2004

(65) Prior Publication Data

US 2006/0131178 A1 Jun. 22, 2006

(51) Int. Cl.
*B01D 53/22* (2006.01)

(52) U.S. Cl. .................. 95/54; 96/4; 96/10; 96/11; 205/763; 205/764; 205/765; 204/295

(58) Field of Classification Search .............. 95/45, 95/54; 96/4, 10, 11; 205/763, 764, 765; 204/295

See application file for complete search history.

(56) References Cited

U.S. PATENT DOCUMENTS

| | | | |
|---|---|---|---|
| 5,240,480 A | | 8/1993 | Thorogood et al. .......... 96/4 |
| 5,569,633 A | * | 10/1996 | Carolan et al. ............. 95/54 |
| 5,820,655 A | * | 10/1998 | Gottzmann et al. .......... 95/54 |
| 5,837,125 A | * | 11/1998 | Prasad et al. .............. 95/54 |
| 6,368,383 B1 | * | 4/2002 | Virkar et al. .............. 95/54 |
| 6,488,739 B1 | * | 12/2002 | Mazanec et al. ............ 95/54 |
| 6,514,314 B2 | * | 2/2003 | Sirman et al. .............. 95/54 |
| 6,565,632 B1 | * | 5/2003 | van Hassel et al. ......... 95/54 |

* cited by examiner

*Primary Examiner*—Jason M. Greene
(74) *Attorney, Agent, or Firm*—David M. Rosenblum

(57) ABSTRACT

A method of separating oxygen from an oxygen containing feed and reacting the oxygen with a reactive substance and an oxygen ion transport membrane element utilized for such purposes. The oxygen ion transport membrane element has a self-supporting dense layer and a surface porous feature in contact with and supported by the dense layer. The porous surface feature may be a layer, a layer having discontinuities or a series of repeating geometrical forms. The dense layer and the porous surface feature are capable of conducting oxygen ions and electrons. The porous surface feature at least in part forms the anode side of the oxygen ion transport membrane element at which the reactive substance reacts with the separated oxygen and has a thickness less than that of the dense layer and a greater surface area than that of a surface of the dense layer adjoining the porous layer. Pores within the porous surface feature have a pore aspect ratio of pore size to pore length of between about 0.1 and about 5.

24 Claims, 1 Drawing Sheet

SEPARATION AND REACTION METHOD UTILIZING AN OXYGEN ION TRANSPORT ELEMENT

FIELD OF THE INVENTION

The present invention relates to a method of separating oxygen from an oxygen containing feed and reacting permeated oxygen with a reactive substance with the use of an oxygen ion transport membrane element. More particularly, the present invention relates to such a method and oxygen ion transport element in which the oxygen ion transport membrane element has a self-supporting dense layer and a porous surface feature in contact with and supported by the dense layer that has a thickness less than the dense layer and an enhanced surface area for the reaction of the oxygen with the reactive substance.

BACKGROUND OF THE INVENTION

Oxygen ion transport membrane elements are utilized to separate oxygen from an oxygen containing feed. Such elements are fabricated from ceramics that are capable of conducting oxygen ions at elevated temperature. Oxygen within the feed is ionized on a surface of the membrane designated as the cathode surface to form oxygen ions. The oxygen ions are conducted through the element to an opposite anode side where the oxygen ions recombine to form elemental oxygen. The electrons released from the ions during the formation of elemental oxygen are conducted to the cathode side of the membrane element to ionize the oxygen.

The oxygen ion transport is driven by an oxygen partial pressure differential between the cathode side and the anode side. This pressure differential is created or facilitated with the use of a reactive substance that reacts with permeated oxygen to consume the oxygen at the anode side and thereby to produce a decrease in oxygen partial pressure. The exact mechanism of such a reaction is unknown in that it is not known whether the oxygen ions recombine to form elemental oxygen which in turn reacts with the reactive substance or whether the reactive substance reacts with the oxygen ions.

In addition to facilitating oxygen ion transport the reaction of permeated oxygen with the reactive substance will function to at least contribute to the heating of the membrane to its operating temperature. Further, the reaction can have other purposes, for example, the reaction can oxidize the reactant substance to a desired product such as a synthesis gas. A yet further purpose for the reaction is that the heat liberated from the reaction, in addition to heating the membrane, can also act to heat a heat transfer fluid such as water within a boiler.

The ceramic material forming the oxygen ion transport membrane element can be mixed conducting and therefore capable of transporting both oxygen ions and electrons. Additionally, the ceramic material can also be a dual phase of an ionic conductor and an electronic conductor to transport both oxygen ions and electrons. Triple phase mixtures of mixed conductors, ionic conductors and electronic conductors have been used for such purposes. Mixed conductors are typically formed from perovskites such as lanthanum strontium cobalt iron oxide and typical ionic conductors are yttria stabilized zirconia and gadolinium doped ceria.

As can well be appreciated, a desirable oxygen ion transport membrane element produces a maximum flux of oxygen. It is known that oxygen permeance increases proportionally with decreasing thickness. Hence, oxygen ion transport membrane elements are typically fabricated with a thin, gas tight dense layer. Such dense layers typically have a thickness of less than 0.5 mm and as such, are supported on structural porous supporting layers.

For instance, in U.S. Pat. No. 5,240,480, composite membrane structures are disclosed having a dense layer thickness of 10 microns supported by one or more porous supporting layers having pore diameters that are less than 20 micrometers. The theory behind such a membrane design is to minimize the bulk diffusion resistance through the dense layer by making it as thin as possible.

The problem with such conventional membrane architectures, as have been discussed above, is that such thin dense layers are fragile and the porous supports, by virtue of their porosity, are also fragile so that the resultant oxygen ion transport membrane element is not particularly durable in service.

As will be discussed, the present invention provides an oxygen separation and reaction method utilizing an oxygen ion transport membrane element that is more durable than prior art elements by virtue of the provision of a relatively thick dense layer that acts to structurally support the element.

SUMMARY OF THE INVENTION

The present invention, in one aspect, provides a method of separating oxygen from an oxygen containing feed and reacting the oxygen with a reactive substance. In accordance with the method, the oxygen containing feed is contacted with a cathode side of an oxygen ion transport membrane element and the oxygen is permeated through the oxygen ion transport membrane element by oxygen ion transport from the cathode side to an anode side thereof.

The oxygen ion transport element has a self-supporting dense layer and a surface porous feature in contact with and supported by the dense layer. The term "surface porous feature" means herein and in the claims, a porous layer, a discontinuous porous layer or a discontinuous porous layer having repeating porous geometric formations that are formed between discontinuities. The dense layer and the porous surface feature are each capable of conducting oxygen ions and electrons and the porous surface feature, at least in part, forms the anode side of the oxygen ion transport membrane element. The porous surface features have a thickness less than that of the dense layer and a greater surface area than that of a surface of the dense layer adjoining the porous layer. Furthermore, the porous surface feature has pores and a pore aspect ratio of pore size to pore length of each of the pores of between about 0.1 and about 5. The terminology "at least in part" is used here and in the claims to indicate that when discontinuous, the porous surface feature only forms only part of the anode side of the membrane, the remaining part being formed by the surface of the dense layer that remains exposed at the discontinuities for reaction with the reactive substance.

The reactive substance is contacted with the anode side of the oxygen ion transport membrane element at the porous surface feature thereof and reacted with the oxygen permeated through the oxygen ion transport membrane element. It is to be noted that, again, the exact reaction mechanism is unknown and the invention as claimed is meant to cover both the possibility that the reactive substance reacts with oxygen ions or with elemental oxygen formed by the recombination of oxygen ions. The reaction provides a driving force for the oxygen ion transport. It is to be noted, that other driving forces may exist, for instance, a higher pressure at the cathode side than the anode side.

In another aspect, the present invention provides an oxygen ion transport element for separating oxygen from an oxygen containing feed and reacting the oxygen with a reactive substance. In accordance with this aspect of the present invention, the oxygen ion transport element comprises a self-supporting dense layer and a surface porous feature in contact with and supported by the dense layer and at which the reactive substance reacts with the oxygen. Each of the dense layer and the porous surface feature are capable of conducting oxygen ions and electrons between opposed cathode and anode sides thereof. The porous surface feature at least in part forms the anode side of the oxygen ion transport membrane element and has a thickness less than that of the dense layer, a greater surface area than that of a surface of the dense layer adjoining the porous layer and a pore aspect ratio of pore size to pore length of pores defined in the surface porous feature of between about 0.1 and about 5.

The use of a self-supporting dense layer, a layer that is substantially gas tight and has substantially no connected through porosity and that also supports the surface feature at the anode side of the membrane element, provides a more robust structure than prior art devices that utilize a thin dense layer that is supported by one or more porous layers. The inventors have unexpectedly found that such a structure can be formed to have acceptable flux when the porous surface feature has a thickness less than that of the dense layer, an enhanced surface area for reaction of the permeated oxygen with the reactive substance and a sufficiently wide pore aspect ratio.

While the inventors do not wish to be held to any specific theory of operation, it is believed that when a prior art, thin dense layer having a very low bulk diffusion resistance is used in connection with a porous support layer that has a higher diffusion resistance, the porous layer is the limiting factor in obtaining suitable oxygen fluxes rather than the thickness of the dense layer. The limiting factor of the porous layer is not thought by the inventors to be only based upon the bulk diffusion resistance and the surface diffusion resistance to oxygen transport. It is believed to be also based upon the ability of the reactive substance to be transported to sites at which reaction can take place. Thus, the pore aspect ratio becomes important for such purposes. Put another way, the theory behind the oxygen ion transport element of the present invention is that the total diffusion resistance of the porous surface feature of the present invention, that is the sum of its bulk diffusion resistance, its surface diffusion resistance and its resistance to gas transfer has to be less than that of the bulk diffusion resistance of the dense layer.

In fact, unlike the prior art, rather than limiting the pore diameters to less than 20 microns, the pores may be exceedingly large resulting in discontinuities of the porous layer. Moreover, the porous layer can be designed to have discontinuities. In such case, the porous layer should cover no less than 50 percent of the dense layer. As will be discussed the porous layer can be made up of regular, repeating porous geometric formations located between the discontinuities. Such repeating porous geometric formations can be of cylindrical configuration.

In any embodiment of the present invention, the dense layer can have a dense layer thickness of between about 500 microns and about 1000 microns. The porous surface feature can have a surface feature thickness of between about 20 microns and about 500 microns, pores having a pore size of pores of between about 1 micron and about 100 microns, and a porosity of between about 30 percent and about 70 percent. In this regard, the term "pore size" means herein and in the claims, average pore diameter as determined by quantitative stereological line intersection analysis, a technique well known in the art. Preferably, the dense layer thickness is between about 700 microns and about 800 microns and the surface feature thickness is between about 100 microns and about 500 microns. Also the pore size is more preferably between about 10 micron and about 50 microns, the porosity is between about 35 percent and about 45 percent and the pore aspect ratio is between about 0.1 and about 2. In a particularly preferred embodiment, the pore size is between about 20 microns and about 40 microns and the pore aspect ratio is between about 0.1 and about 2.

In any embodiment of the present invention, the dense layer and the porous surface feature are formed from a mixed conductor or a dual phase conductor. Furthermore, any embodiment of the present invention can be provided with a porous surface enhancement layer at the cathode side to enhance the formation of oxygen ions. Such porous surface enhancement layer can have a thickness of less than about 300 microns and surface enhancement pores of greater than about 20 microns in pore size and a porosity of between about 35 percent and about 70 percent. A porosity of between about 50 percent and about 60 percent is particularly preferred for the porous surface enhancement layer.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
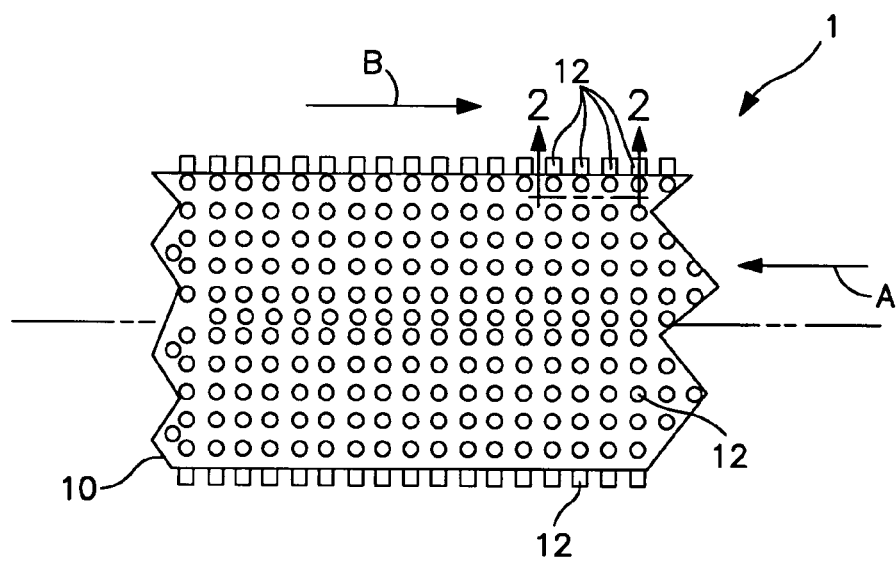
FIG. 1 is a fragmentary, schematic view of a tubular oxygen ion transport membrane element in accordance with the present invention.
Figure 2:
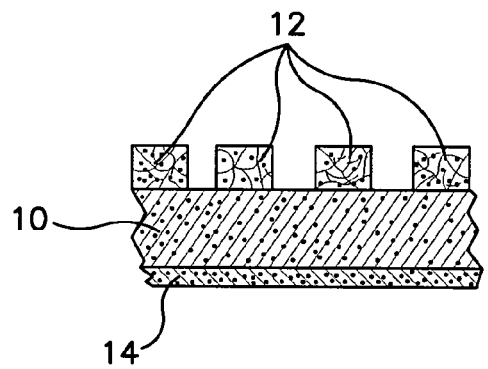
FIG. 2 is a sectional view of FIG. 1, taken along line 2-2 thereof.

With reference to FIGS. 1 and 2 an oxygen ion transport membrane element 1 in accordance with the present invention is illustrated. Oxygen ion transport membrane element 1 is in the form of a tube, but, as well understood by those skilled in the art, could take other forms such as a flat plate.

Oxygen transport membrane element 1 has a dense layer 10 and a discontinuous porous layer made up of repeating cylindrical projections 12 connected to and in contact with dense layer 10. An optional surface enhancement layer 14 can also be provided in contact with dense layer 10 and opposite to the repeating cylindrical projections 12. Surface enhancement layer 14 is said to be optional in that in an embodiment of the present invention, such layer could be deleted. Although repeating cylindrical projections 12 are shown on the outer surface of the tubular form and the surface enhancement layer 14 is on the inner surface of such form, the placement of the same could be reversed.

An oxygen containing feed indicated by arrowhead "A", for instance air, is fed into the inside of oxygen transport membrane element 1 to contact optional surface enhancement layer 14. Surface enhancement layer 14 acts to decrease surface diffusion resistance of oxygen to oxygen ions. The oxygen ions are transported through dense layer 10 and emerge at its outer surface and repeating cylindrical projections 12 where they either combine or react with a reactive substance indicated by arrowhead "B", for instance, a fuel such as natural gas.

For purposes of illustration, dense layer 10, repeating cylindrical projections 12 and surface enhancement layer 14 can all be formed from a mixed conducting ceramic material. It is understood that any or all of such layers could be formed of mixtures of ionic conductors, electrically conductive metals or metallic oxides or mixed conductors or two or three phase mixtures exhibiting both electrical and ionic conductivity.

Dense layer 10 in oxygen transport membrane element 1 is the supporting structure and is between about 500 microns and about 1000 microns in thickness. A thickness of between about 700 microns and 800 microns is particularly preferred as the best combination of robustness and bulk diffusion resistance.

Figure 3:
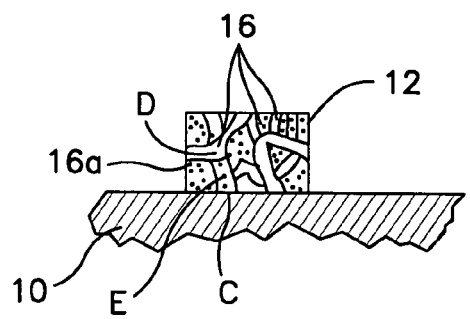
FIG. 3 is an enlarged, fragmentary view of FIG. 2.

With additional reference to FIG. 3, each of the repeating cylindrical projections 12 are about 500 microns in height, about 500 microns in diameter and are situated about 100 microns apart. Embodiments could feature heights of between about 100 to about 500 microns, diameter between about 100 to about 1000 microns and spacing between projection of between about 100 and about 500 microns. Repeating cylindrical projections 12 are provided with pores 16. The pore size of pores 16 within repeating cylindrical projections 12 can be between about 1 micron and 100 microns and the porosity can be between about 30 and 70 percent. More preferably, the pore sizes are between 20 microns and 40 microns and the porosity is preferably between about 35 percent and about 45 percent.

As indicated previously, it is necessary for the pores to be sized such that the reacting substance can enter the pores and the oxygen can escape to react with the reactive substance. This pore size criteria can be met with pores having an aspect ratio of pore size to pore length. The pore size is the pore diameter as measured by mercury porosymetry. The pore length is the length of a pore as measured from the dense layer 10 to its outlet from projections 12 or other porous surface feature. For example, with specific reference to pore 16a, its length is measured from point "C", situated on the surface of dense layer 10, to the pore outlet from the projections 12, at point "D", as measured along the dashed line "E". The aspect ratio of each of the pores should range between about 0.1 and about 5, more preferably between about 0.1 and about 2 and most preferably between 0.1 and about 1.

It is to be noted that although the porous surface feature has been discussed with reference to repeating cylindrical projections 12, the above preferred height (or thickness of a layer), pore size, porosity and aspect ratio are also applicable to any porous surface feature, including a continuous layer or a layer having discontinuities by, for example large pores as compared to layer thickness. As mentioned above, any porous surface feature of the present invention should have a thickness that is less than the dense layer 10 and that present a greater surface area than the adjoining surface area of the dense layer. This adjoining surface area is simply the outer cylindrical surface area of the dense layer 10 which in the instant embodiment is the circumferential area obtaining by multiplying the outer tube diameter of dense layer 10, the tube length and pi.

The optional surface enhancement layer 14 lowers the resistance to the creation of oxygen ions and therefore further increases flux of the membrane. Optional surface enhancement layer 14 is preferably no greater than 300 microns. The pores within surface enhancement layer 14 are preferably greater than about 20 microns and produce a porosity of between about 35 percent and about 70 percent. A porosity of between about 50 percent and about 60 percent is preferred.

Oxygen ion transport membrane element 1 can be conventionally formed by an isopressing process in which a mixture of particles that conduct ions, for instance a mixed conducting perovskite are mixed with a plasticizing agent and solvent. The resulting mixture can be isopressed into a tube or flat plate by known isopressing techniques. Porous layers forming the optional surface enhancement layer 14 and the repeating cylindrical projections 12 can be separately added by adding fugitive pore formers to the mixture and then isopressing such layers on the green form. Repeating cylindrical projections 12 can be formed by the isopressing mold having regular cylindrical indentations to form repeating cylindrical projections 12. Other shapes could be machined into a porous layer formed on the dense layer. The resultant green form can then be fired to burn out the binder and evaporate the solvent and to sinter the ceramic material into the finished element.

For exemplary purposes, tubes were formed using prior art techniques and in accordance with the present invention with the use of a porous surface feature in the form of a porous layer. The tests were conducted at 900° C. using a 50/50 mixture of hydrogen and carbon dioxide as the reactive substance at a flow rate of 4 liters per minute and air as the oxygen containing gas at a flow rate of 8 liters per minute. In all cases, the porous layer had pores of about 30 microns in diameter and a porosity of between about 30 percent and about 35 percent. The tubes had an outer diameter of about 1.75 cm and an inner diameter of about 1.5 cm.

| Dense Layer Thickness (Microns) | Porous Layer Thickness (Microns) | Flux sccm/cm$^2$ | Fuel Pressure (PSIG) | Air Pressure (PSIG) |
|---|---|---|---|---|
| 100 | 1000 | 7.8 | 88 | 11 |
| 775 | 450 | 10.3 | 95 | 11 |
| 900 | 200 | 9.9 | 103 | 23 |

The tube having a dense layer thickness of about 100 microns was formed to illustrate the flux in a prior art tube, that is a thin dense layer supported by a porous supporting layer. It is evident that the other two runs with tubes formed in a manner of the present invention (dense layer thicknesses of about 775 microns and about 900 microns) out performed the prior art tube in the environment inicated above. Further, the effect of pressure was almost negligible over the pressure ranges selected for the testing.

Although the present invention has been described with reference to a preferred embodiment, as will occur to those skilled in the art, numerous changes, additions and omissions may be made without departing from the spirit and scope of the present inventions.

We claim:

1. A method of separating oxygen from an oxygen containing feed and reacting the oxygen with a reactive substance, said method comprising:

contacting the oxygen containing feed with a cathode side of an oxygen ion transport membrane element and permeating the oxygen through the oxygen ion transport membrane element by oxygen ion transport from the cathode side to an anode side thereof;

the oxygen ion transport membrane element having a self-supporting dense layer and a surface porous feature in contact with and supported by the dense layer, each of the dense layer and the porous surface feature being capable of conducting oxygen ions and electrons, the porous surface feature at least in part forming the anode side of the oxygen ion transport membrane element and having a thickness less than that of the dense layer, a greater surface area than that of a surface of the dense layer adjoining the porous surface feature and a pore aspect ratio of pore size to pore length of pores defined in the surface porous feature of between about 0.1 and about 5;

contacting the reactive substance with the anode side of the oxygen ion transport membrane element at the porous surface feature thereof and reacting the reactive substance with the oxygen permeated through the oxygen ion transport membrane element; and the reaction providing a driving force for the oxygen ion transport.

2. The method of claim 1, wherein the porous surface feature is discontinuous and covers no less than about 50 percent of the dense layer.

3. The method of claim 2, wherein the porous surface feature are repeating porous geometric formations.

4. The method of claim 3, wherein the repeating porous geometric formations are of cylindrical configuration.

5. The method of claim 1, wherein:
said dense layer has a dense layer thickness of between about 500 microns and about 1000 microns; and
said porous surface feature has a surface feature thickness of between about 20 microns and about 500 microns, pores having a pore size of pores of between about 1 micron and about 100 microns, and a porosity of between about 30 percent and about 70 percent.

6. The method of claim 5, wherein:
said dense layer thickness is between about 700 microns and about 800 microns; and
said surface feature thickness is between about 100 microns and about 500 microns.

7. The method of claim 6, wherein:
the pore size is between about 10 micron and about 50 microns;
the porosity is between about 35 percent and about 45 percent; and
the pore aspect ratio is between about 0.1 and about 2.

8. The method of claim 7, wherein:
said pore size is between about 20 microns and about 40 microns; and
the pore aspect ratio is between about 0.1 and about 2.

9. The method of claim 1, wherein the dense layer and the porous surface feature are formed from a mixed conductor or a dual phase conductor.

10. The method of claim 1 or claim 2, wherein the oxygen ion transport membrane element further has a porous surface enhancement layer at the cathode side to enhance formation of oxygen ions.

11. The method of claim 10, wherein the porous surface enhancement layer has an enhancement layer thickness of less than about 300 microns and surface enhancement pores of greater than about 20 microns in pore size and a porosity of between about 35 percent and about 70 percent.

12. The method of claim 11, wherein the porosity is between about 50 percent and about 60 percent.

13. An oxygen ion transport element for separating oxygen from an oxygen containing feed and reacting the oxygen with a reactive substance, said oxygen ion transport element comprising:
a self-supporting dense layer and a surface porous feature in contact with and supported by the dense layer and at which the reactive substance reacts with the oxygen;
the dense layer and the porous surface feature each being capable of conducting oxygen ions and electrons between opposed cathode and anode sides thereof; and
the porous surface feature at least in part forming the anode side of the oxygen ion transport membrane element and having a thickness less than that of the dense layer, a greater surface area than that of a surface of the dense layer adjoining the porous layer and a pore aspect ratio of pore size to pore length of pores defined in the surface porous feature of between about 0.1 and about 5.

14. The oxygen ion transport element of claim 13, wherein the porous surface feature is discontinuous and covers no less than about 50 percent of the dense layer.

15. The oxygen ion transport element of claim 14, wherein the porous surface feature are repeating porous geometric formations.

16. The oxygen ion transport element of claim 15, wherein the repeating porous geometric formations are of cylindrical configuration.

17. The oxygen ion transport element of claim 13, wherein:
said dense layer has a dense layer thickness of between about 500 microns and about 1000 microns; and
said porous surface feature has a surface feature thickness of between about 20 microns and about 500 microns, pores having a pore size of pores of between about 1 micron and about 100 microns and a porosity of between about 30 percent and about 70 percent.

18. The oxygen ion transport element of claim 17, wherein:
said dense layer thickness is between about 700 microns and about 800 microns; and
said surface feature thickness is between about 100 microns and about 500 microns.

19. The oxygen ion transport element of claim 18, wherein:
the pore size is between about 10 micron and about 50 microns;
the porosity is between about 35 percent and about 45 percent; and
the pore aspect ratio is between about 0.1 and about 2.

20. The oxygen ion transport element of claim 19, wherein:
said pore size is between about 20 microns and about 40 microns; and
the pore aspect ratio is between about 0.1 and about 2.

21. The oxygen ion transport element of claim 13, wherein said dense layer or the porous surface feature is a mixed conductor or a dual phase conductor.

22. The oxygen ion transport element of claim 13 or claim 14, wherein the oxygen ion transport membrane element further has a porous surface enhancement layer at the cathode side to enhance the formation of oxygen ions.

23. The oxygen ion transport element of claim 22, wherein the surface enhancement layer having an enhancement layer thickness of less than about 300 microns and surface enhancement pores of greater than about 20 microns in pore size and a porosity of between about 35 percent and about 70 percent.

24. The oxygen ion transport element of claim 23, wherein the porosity is between about 50 percent and about 60 percent.

* * * * *